United States Patent
Glugla et al.

(10) Patent No.: US 9,399,968 B2
(45) Date of Patent: Jul. 26, 2016

(54) ENGINE CONTROL FOR A LIQUID PETROLEUM GAS FUELED ENGINE

(71) Applicant: Ford Global Technologies, LLC, Dearborn, MI (US)

(72) Inventors: Chris Paul Glugla, Macomb, MI (US); Eric Warren Curtis, Milan, MI (US); Gopichandra Surnilla, West Bloomfield, MI (US); John Hedges, Canton, MI (US); Mark Allen Dearth, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 350 days.

(21) Appl. No.: 14/019,191

(22) Filed: Sep. 5, 2013

(65) Prior Publication Data

US 2015/0059686 A1 Mar. 5, 2015

(51) Int. Cl.
*F02D 19/02* (2006.01)
*F02P 5/00* (2006.01)
(Continued)

(52) U.S. Cl.
CPC .............. *F02D 41/30* (2013.01); *F02D 19/024* (2013.01); *F02D 19/061* (2013.01); *F02D 19/0647* (2013.01); *F02D 35/027* (2013.01); *F02D 41/0027* (2013.01); *F02D 41/3094* (2013.01); *F02D 41/402* (2013.01); *F02M 21/0284* (2013.01); *F02P 5/1522* (2013.01); *F02D 13/0207* (2013.01); *F02D 13/0219* (2013.01); *F02D 19/0689* (2013.01);
(Continued)

(58) Field of Classification Search
CPC . F02D 41/008; F02D 41/1475; F02D 41/402; F02D 41/3094; F02D 41/0085; F02D 19/024; F02D 19/0647
USPC .......... 123/299–305, 406.21, 406.29, 406.39; 701/105
See application file for complete search history.

(56) References Cited

U.S. PATENT DOCUMENTS

| 5,713,328 A | 2/1998 | Anderson et al. |
| 6,062,189 A * | 5/2000 | Kaneko ................. F02B 17/005 123/295 |

(Continued)

FOREIGN PATENT DOCUMENTS

| EP | 0121028 A1 | 3/1983 |
| EP | 0648930 A2 | 4/1995 |

OTHER PUBLICATIONS

Glugla, Chris Paul et al., "Method and System for Pre-Ignition Control," U.S. Appl. No. 13/538,999, filed Jun. 29, 2012, 66 pages.
(Continued)

*Primary Examiner* — Hung Q Nguyen
*Assistant Examiner* — George Jin
(74) *Attorney, Agent, or Firm* — Julia Voutyras; Alleman Hall McCoy Russell & Tuttle LLP

(57) ABSTRACT

A method for an engine, comprising: during a first condition comprising a high engine temperature, injecting a first quantity of liquid petroleum gas into a first engine cylinder at a first timing during an intake stroke; and injecting a second quantity of liquid petroleum gas into the first engine cylinder at a second timing during a compression stroke following the intake stroke. In this way, combustion knock and cylinder pre-ignition may be mitigated without retarding spark ignition and/or limiting engine load, thereby allowing for maximum engine performance.

20 Claims, 8 Drawing Sheets

(51) Int. Cl.

| | | |
|---|---|---|
| F02D 41/30 | (2006.01) | |
| F02D 41/40 | (2006.01) | |
| F02P 5/152 | (2006.01) | |
| F02D 35/02 | (2006.01) | |
| F02M 21/02 | (2006.01) | |
| F02D 19/06 | (2006.01) | |
| F02D 41/00 | (2006.01) | |
| F02D 13/02 | (2006.01) | |
| F02D 19/08 | (2006.01) | |

(52) U.S. Cl.
CPC .......... *F02D 19/0692* (2013.01); *F02D 19/084* (2013.01); *F02D 41/0025* (2013.01); *Y02T 10/32* (2013.01); *Y02T 10/36* (2013.01); *Y02T 10/44* (2013.01); *Y02T 10/46* (2013.01)

(56) References Cited

U.S. PATENT DOCUMENTS

| | | | | |
|---|---|---|---|---|
| 6,202,601 | B1* | 3/2001 | Ouellette | F02B 1/12 123/27 GE |
| 6,636,797 | B2 | 10/2003 | Yoshizawa et al. | |
| 7,000,573 | B2 | 2/2006 | Kruger | |
| 7,444,986 | B2 | 11/2008 | Shute | |
| 8,073,613 | B2 | 12/2011 | Rollinger et al. | |
| 8,095,297 | B2 | 1/2012 | Glugla et al. | |
| 8,100,107 | B2 | 1/2012 | Bidner et al. | |
| 8,214,128 | B2 | 7/2012 | Watkins et al. | |
| 8,245,692 | B2 | 8/2012 | Glugla et al. | |
| 8,275,538 | B2 | 9/2012 | Surnilla et al. | |
| 8,327,823 | B2 | 12/2012 | Courtoy et al. | |
| 8,447,496 | B2 | 5/2013 | Krengel et al. | |
| 8,463,533 | B2* | 6/2013 | Glugla | F02D 35/027 123/406.3 |
| 2002/0078918 | A1* | 6/2002 | Ancimer | F02B 1/12 123/295 |
| 2003/0051692 | A1* | 3/2003 | Mizutani | F02D 11/105 123/179.15 |
| 2005/0155344 | A1* | 7/2005 | Kobayashi | F02B 1/12 60/286 |
| 2006/0207562 | A1* | 9/2006 | Miyazaki | F02D 35/027 123/431 |
| 2006/0243241 | A1* | 11/2006 | Kuo | F01L 13/00 123/295 |
| 2006/0278196 | A1* | 12/2006 | Beer | F02D 13/0261 123/299 |
| 2009/0281709 | A1* | 11/2009 | Mallebrein | F02D 35/025 701/104 |
| 2009/0308367 | A1* | 12/2009 | Glugla | F02D 19/081 123/575 |
| 2011/0017174 | A1* | 1/2011 | Ulrey | F02D 19/0694 123/456 |
| 2011/0174263 | A1* | 7/2011 | Leone | F02B 47/02 123/25 C |
| 2011/0191007 | A1* | 8/2011 | Glugla | F02D 41/0085 701/103 |
| 2011/0265758 | A1* | 11/2011 | Glugla | F02B 23/104 123/299 |
| 2011/0313641 | A1* | 12/2011 | Glugla | F02D 35/02 701/104 |
| 2012/0031371 | A1* | 2/2012 | Sabathil | F02M 21/0212 123/294 |
| 2012/0041665 | A1 | 2/2012 | Pursifull et al. | |
| 2012/0245827 | A1* | 9/2012 | Glugla | F02D 41/402 701/105 |
| 2013/0035841 | A1* | 2/2013 | Glugla | F02D 41/22 701/105 |
| 2013/0139786 | A1* | 6/2013 | Glugla | F02D 41/0087 123/321 |
| 2013/0238217 | A1 | 9/2013 | Nolan et al. | |
| 2013/0238226 | A1 | 9/2013 | Slaymaker et al. | |
| 2014/0238340 | A1* | 8/2014 | Dunn | F02M 43/00 123/299 |

OTHER PUBLICATIONS

Glugla, Chris Paul et al., "Method and System for Pre-Ignition Control," U.S. Appl. No. 13/539,045, filed Jun. 29, 2012, 67 pages.

Matthews, Patrick et al., "Turbocharger System having an Air-Cooled Wastegate Actuator," U.S. Appl. No. 13/588,593, filed Aug. 12, 2012, 25 pages.

Yi, Jianwen James et al., "Approach for Controlling Exhaust Gas Recirculation," U.S. Appl. No. 13/648,563, filed Oct. 10, 2012, 41 pages.

Surnilla, Gopichandra et al., "Method and System for Engine Control," U.S. Appl. No. 13/764,624, filed Dec. 19, 2012, 43 pages.

Leone, Thomas G. et al., "Liquid Injection for Scavenging," U.S. Appl. No. 13/748,452, filed Jan. 23, 2013, 29 pages.

Glugla, Chris Paul et al., "Method and System for Pre-Ignition Control," U.S. Appl. No. 13/829,681, filed Mar. 14, 2013, 47 pages.

Leone, Thomas G., "Method and System for Vacuum Control," U.S. Appl. No. 13/829,976, filed Mar. 14, 2013, 37 pages.

Surnilla, Gopichandra et al., "Method and System for Engine Control," U.S. Appl. No. 13/854,835, filed Apr. 1, 2013, 50 pages.

Surnilla, Gopichandra et al., "Method and System for Engine Control," U.S. Appl. No. 13/854,840, filed Apr. 1, 2013, 58 pages.

Dearth, Mark Allen et al., "Direct Injection of Diluents or Secondary Fuels in Gaseous Fuel Engines," U.S. Appl. No. 13/764,624, filed May 7, 2013, 46 pages.

* cited by examiner

ENGINE CONTROL FOR A LIQUID PETROLEUM GAS FUELED ENGINE

BACKGROUND AND SUMMARY

Spark ignition engines may be prone to combustion knock under high loads. Following spark ignition, areas of the uncombusted air/fuel mixture may self-ignite, causing a large pressure wave that resonates the engine block. Increased air charge temperatures, increased compression ratios, and lower fuel octane levels may exacerbate the problem. A typical method for mitigating engine knock includes retarding the spark ignition timing, thus slowing the combustion burn rate. However, this also has the effect of decreasing fuel economy and deteriorating engine performance during wide open throttle conditions.

Similarly, boosted engines may be prone to cylinder pre-ignition when operating at high load and relatively low engine speed. Cylinder pre-ignition may manifest as "mega-knock", producing high-pressure spikes that may damage engine components. Cylinder pre-ignition is typically addressed by reducing engine load. However, this also reduces engine performance.

Gasoline engines utilizing late injection timing may be particularly prone to combustion knock and cylinder pre-ignition. Late injection of gasoline may cause deposits of soot and/or particulate matter within the cylinder. This in turn may free oil that may act as an ignition source for combustion knock or cylinder pre-ignition.

The inventors herein have realized that the above issues may be addressed in part by one or more methods. In one example, a method for an engine, comprising: during a first condition comprising a high engine temperature, injecting a first quantity of liquid petroleum gas into a first engine cylinder at a first timing during an intake stroke; and injecting a second quantity of liquid petroleum gas into the first engine cylinder at a second timing during a compression stroke following the intake stroke. In this way, combustion knock and cylinder pre-ignition may be mitigated without retarding spark ignition and/or limiting engine load, thereby allowing for maximum engine performance.

In another example, a method of mitigating combustion knock in a liquid-petroleum gas fueled engine, comprising: in response to the detection of combustion knock in a first engine cylinder, port fuel injecting a first quantity of fuel into the first engine cylinder when an intake valve of the first cylinder is open; direct fuel injecting a second quantity of fuel into the first engine cylinder when the intake valve of the first cylinder is closed; port fuel injecting a third quantity of fuel into a second engine cylinder when an intake valve of the second cylinder is open; and direct fuel injecting a fourth quantity of fuel into the second engine cylinder when the intake valve of the second cylinder is closed. In this way, combustion knock may be mitigated without retarding spark ignition from minimum best timing, or by reducing the amount of spark ignition retard from minimum best timing, thereby allowing for maximum fuel economy and maximum engine performance during wide open throttle conditions.

In yet another example, a method of mitigating cylinder pre-ignition in a liquid-petroleum fueled engine, comprising: in response to the detection of cylinder pre-ignition in a first engine cylinder, port fuel injecting a first quantity of fuel into the first engine cylinder when an intake valve of the first cylinder is open; direct fuel injecting a second quantity of fuel into the first engine cylinder when the intake valve of the first cylinder is closed; port fuel injecting a third quantity of fuel into a second engine cylinder when an intake valve of the second cylinder is open; and direct fuel injecting a fourth quantity of fuel into the second engine cylinder when the intake valve of the second cylinder is closed. In this way, cylinder pre-ignition may be mitigated without limiting engine load, or by reducing the amount of engine load limiting, thereby allowing for maximum engine performance.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

FIG. 1 schematically depicts an example embodiment of a cylinder of an internal combustion engine.

FIG. 2 schematically depicts an example embodiment of a multi-cylinder engine.

DETAILED DESCRIPTION

Figure 1:
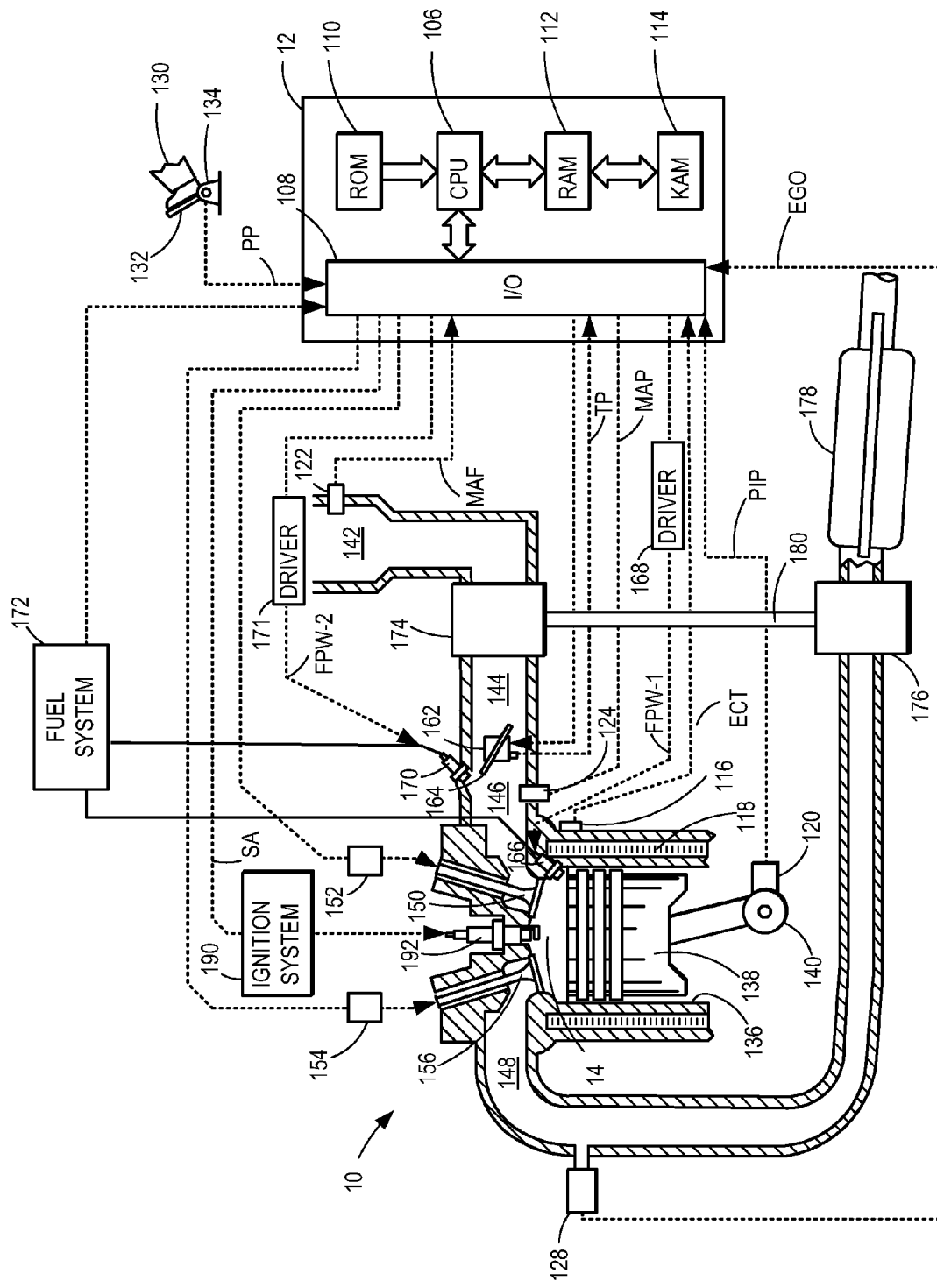
Figure 2:
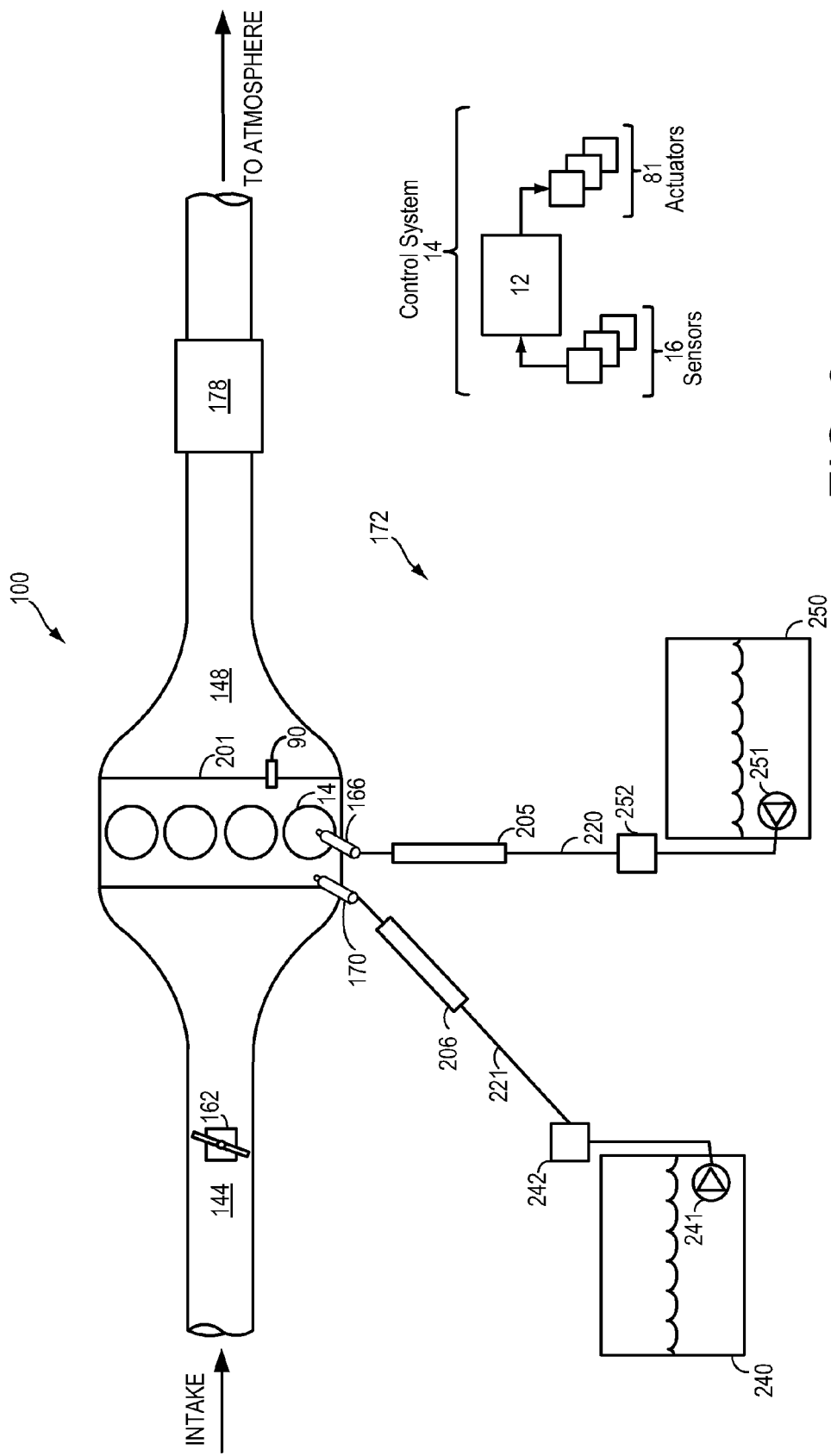

The following description relates to systems and methods for addressing combustion knock and cylinder pre-ignition in LPG fueled engines, such as the engines schematically diagrammed in FIGS. 1 and 2. The systems may include an LPG fuel tank coupled to a direct-fuel injector. A controller may be programmed to control the rate and timing of fuel injection through a control routine, such as the routines described in FIGS. 3 and 5. In the event of combustion knock, the controller may also be programmed to control spark timing. In the event of cylinder pre-ignition, the controller may also be programmed to control engine load. The timing of fuel injection may be set to coincide with events during the combustion cycle of an engine cylinder, as depicted in FIGS. 4A, 4B, 6A, and 6B.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or may alternatively be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on combustion knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from high pressure fuel system 172 including a fuel tank, fuel pumps, a fuel rail, and driver 168. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW-2 received from controller 12 via electronic driver 171. Fuel may be delivered to fuel injector 170 by fuel system 172.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions such as described herein below. The relative distribution of the total injected fuel among injectors 166 and 170 may be referred to as a first injection ratio. For example, injecting a larger amount of the fuel for a combustion event via (port) injector 170 may be an example of a higher first ratio of port to direct injection, while injecting a larger amount of the fuel for a combustion event via (direct) injector 166 may be a lower first ratio of port to direct injection. Note that these are merely examples of different injection ratios, and various other injection ratios may be used. Additionally, it should be appreciated that port injected fuel may be delivered during an open intake valve event, closed intake valve event (e.g., substantially before an intake stroke, such as during an exhaust stroke), as well as during both open and closed intake valve operation. Similarly, directly injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the compression stroke, multiple injections during the intake stroke or a combination of some direct injections during the compression stroke and some during the intake stroke. When multiple direct injections are performed, the relative distribution of the total directed injected fuel between an intake stroke (direct) injection and a compression stroke (direct) injection may be referred to as a second injection ratio. For example, injecting a larger amount of the direct injected fuel for a combustion event during an intake stroke may be an example of a higher second ratio of intake stroke direct injection, while injecting a larger amount of the fuel for a combustion event during a compression stroke may be an example of a lower second ratio of intake stroke direct injection. Note that these are merely examples of different injection ratios, and various other injection ratios may be used.

As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel system 172 may include one fuel tank or multiple fuel tanks. In embodiments where fuel system 172 includes multiple fuel tanks, the fuel tanks may hold fuel with the same fuel qualities or may hold fuel with different fuel qualities, such as different fuel compositions. These differences may include different alcohol content, different octane, different heat of vaporizations, different fuel blends, and/or combinations thereof etc. In one example, fuels with different alcohol contents could include gasoline, ethanol, methanol, or alcohol blends such as E85 (which is approximately 85% ethanol and 15% gasoline) or M85 (which is approximately 85% methanol and 15% gasoline). Other alcohol containing fuels could be a mixture of alcohol and water, a mixture of alcohol, water and gasoline etc. In some examples, fuel system 172 may include a fuel tank holding a liquid fuel, such as gasoline, and also include a fuel tank holding a gaseous fuel, such as CNG. Fuel injectors 166 and 170 may be configured to inject fuel from the same fuel tank, from different fuel tanks, from a plurality of the same fuel tanks, or from an overlapping set of fuel tanks.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. An example routine that may be performed by the controller is described at FIG. 3.

FIG. 2 shows a schematic diagram of a multi-cylinder engine 100 in accordance with the present disclosure. As depicted in FIG. 1, internal combustion engine 100 includes cylinders 14 coupled to intake passage 144 and exhaust passage 148. Intake passage 144 may include throttle 162. Exhaust passage 148 may include emissions control device 178.

Cylinders 14 may be configured as part of cylinder head 201. In FIG. 2, cylinder head 201 is shown with 4 cylinders in an inline configuration. In some examples, cylinder head 201 may have more or fewer cylinders, for example six cylinders. In some examples, the cylinders may be arranged in a V configuration or other suitable configuration.

Cylinder head 201 is shown coupled to fuel system 172. Cylinder 14 is shown coupled to fuel injectors 166 and 170. Although only one cylinder is shown coupled to fuel injectors, it is to be understood that all cylinders 14 included in cylinder head 201 may also be coupled to one or more fuel injectors. In this example embodiment, fuel injector 166 is depicted as a direct fuel injector and fuel injector 170 is depicted as a port fuel injector. Each fuel injector may be configured to deliver a specific quantity of fuel at a specific time point in the engine cycle in response to commands from controller 12. One or both fuel injectors may be utilized to deliver combustible fuel to cylinder 14 during each combustion cycle. The timing and quantity of fuel injection may be controlled as a function of engine operating conditions. Control of the timing and quantity of fuel injection will be discussed further below and with regards to FIGS. 3-6.

Fuel injector 170 is shown coupled to fuel rail 206. Fuel rail 206 may be coupled to fuel line 221. Fuel line 221 may be coupled to fuel tank 240. Fuel pump 241 may be coupled to fuel tank 240 and fuel line 221. Fuel rail 206 may include a plurality of sensors, including a temperature sensor and a pressure sensor. Similarly, fuel line 221 and fuel tank 240 may include a plurality of sensors, including temperature and pressure sensors. Fuel tank 240 may also include a refueling port.

In some embodiments, fuel tank 240 may contain a gaseous fuel, such as CNG, methane, LPG, hydrogen gas, etc. In embodiments where fuel tank 240 contains a gaseous fuel, tank valve 242 may be coupled to fuel line 221 upstream of fuel pump 241. A line valve may be coupled to fuel line 221 upstream of the tank valve. A pressure regulator may be coupled to fuel line 221 upstream of the line valve. Fuel line 221 may also be coupled to a coalescing filter and may further include a pressure relief valve upstream of fuel rail 206.

Fuel injector 166 is shown coupled to fuel rail 205. Fuel rail 205 may be coupled to fuel line 220. Fuel line 220 may be coupled to fuel tank 250. Fuel pump 251 may be coupled to fuel tank 250 and fuel line 220. Fuel rail 205 may include a plurality of sensors, including a temperature sensor and a pressure sensor. Similarly, fuel line 220 and fuel tank 250 may include a plurality of sensors, including temperature and pressure sensors. Fuel tank 250 may also include a refueling port. In embodiments where fuel tank 250 contains a gaseous fuel, tank valve 252 may be coupled to fuel line 220 upstream of fuel pump 251. A line valve may be coupled to fuel line 220 upstream of the tank valve. A pressure regulator may be coupled to fuel line 220 upstream of the line valve. Fuel line 220 may also be coupled to a coalescing filter and may further include a pressure relief valve upstream of fuel rail 205.

In some embodiments fuel rail 205 may be configured as a higher-pressure fuel rail and fuel rail 206 may be configured as a lower pressure fuel rail. Fuel injectors 170 and 166 may be coupled to the same fuel tank via fuel lines 221 and 220, respectively.

Control system 14 include controller 12 which may receive information from a plurality of sensors 16 and may send control signals to a plurality of actuators 81 as described herein and with regards to FIG. 1. Engine system 100 may further include one (as depicted) or more knock sensors 90 distributed along cylinder head 201. When included, the plurality of knock sensors may be distributed symmetrically or asymmetrically along the engine block. Knock sensor 90 may be an accelerometer, a pressure sensor, or an ionization sensor.

An engine controller may be configured to detect and differentiate abnormal combustion events due to combustion knocking from those indicative of cylinder pre-ignition based on the output (e.g., signal timing, amplitude, intensity, frequency, etc.) of the one or more knock sensors 90. As used herein, combustion knock refers to the auto-ignition of air/fuel within a cylinder following spark ignition. Cylinder pre-ignition refers to the auto-ignition of air/fuel within a cylinder prior to spark ignition, and is typically characterized as being a greater magnitude event than combustion knock. In one example, a cylinder pre-ignition event may be determined based on a combustion knock signal estimated in a first, earlier window being larger than a first, higher threshold, while a combustion knock event may be determined based on a combustion knock signal estimated in a second, later window being larger than a second, lower threshold. In one example, the windows in which the knock signals are estimated may be crank angle windows. The windows may be partially overlapping, or completely distinct. In some embodiments, the engine system may include dedicated pre-ignition sensors in addition to knock sensors 90.

Mitigating actions taken by the engine controller to address knock may also differ from those taken by the controller to address pre-ignition. Examples of mitigating actions are described herein and with regards to FIGS. 3-6.

Figure 3:
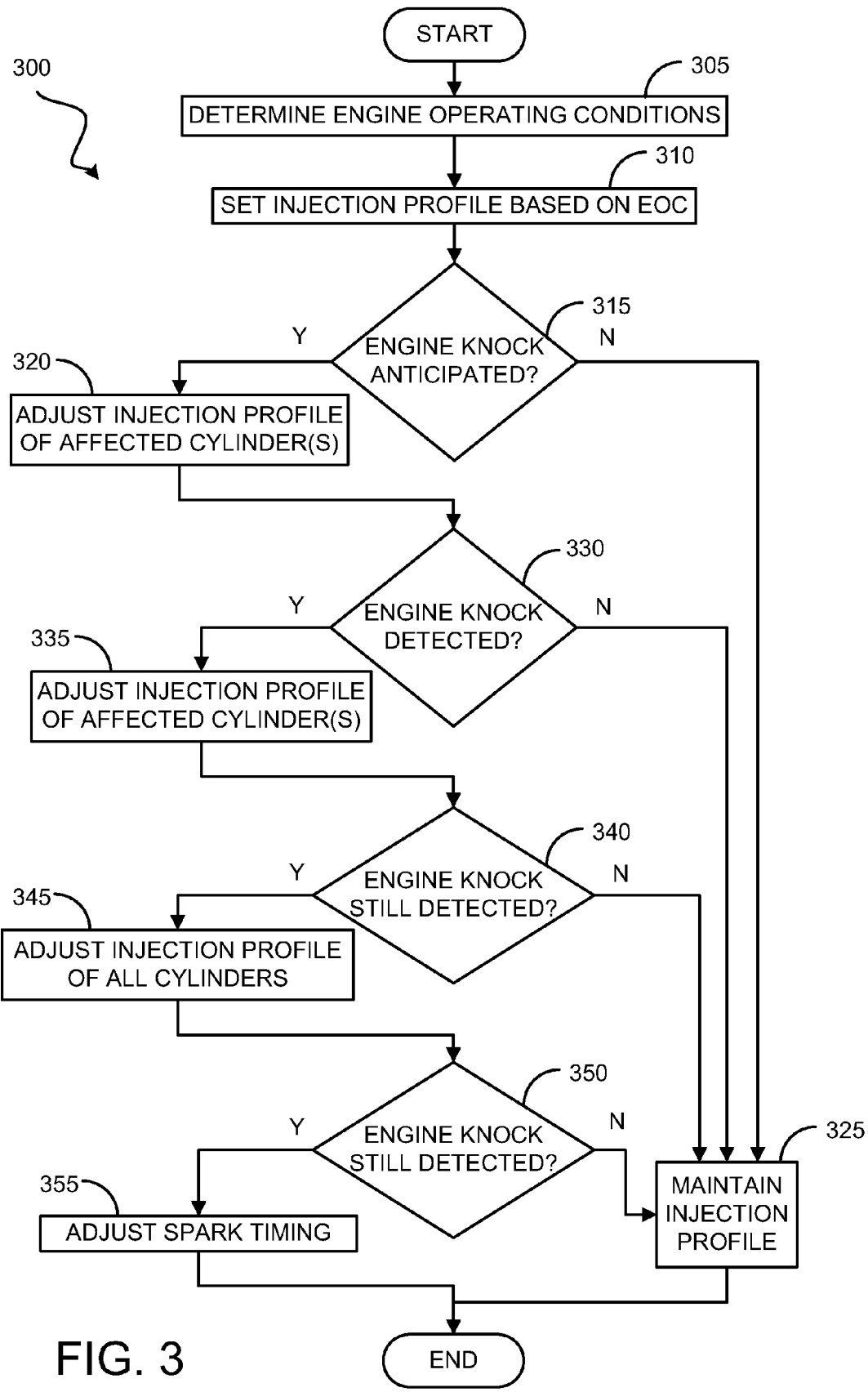
FIG. 3 depicts an example high level flow chart for mitigating combustion knock in a liquid petroleum gas fueled engine.

FIG. 3 depicts an example high-level method 300 for controlling combustion knock in an LPG fueled, direct injected internal combustion engine. Method 300 may be configured as computer instructions stored by a control system and implemented by a controller, for example controller 12 as shown in FIGS. 1 and 2. FIG. 3 will be described in reference to components and features of the example engine detailed in FIGS. 1 and 2, but it should be recognized that method 300 or other equivalent methods may be performed with respect to a plurality of engine configurations without departing from the scope of this disclosure. Method 300 may be run repeatedly throughout the course of engine operation.

Method 300 may begin at 305 by measuring or estimating engine operating conditions (EOC). As non-limiting examples, the operating conditions may include ambient temperature and pressure, pedal position (PP), engine speed, engine load, engine temperature, manifold air flow (MAF), manifold air pressure (MAP), manifold charge temperature (MCT), etc. At 310, method 300 may include setting a fuel injection profile based on the EOC. The fuel injection profile may include a single injection or multiple injections. The injection profile may include port fuel injections (PFI), direct fuel injections (DI) or a combination of the two.

Continuing at 315, method 300 may include determining whether combustion knock is anticipated. Determining if combustion knock is anticipated may include evaluating current and anticipated engine operating conditions, such as engine temperature and engine load, and may further include determining which, if any, cylinders may be prone to combustion knock based on the current or anticipated engine operating conditions. If combustion knock is not anticipated, method 300 may proceed to 325. At 325, method 300 may include maintaining the current fuel injection profile. If combustion knock is anticipated, method 300 may proceed to 320.

At 320, method 300 may include adjusting the injection profile of one or more affected cylinders where knock is anticipated. Adjusting the injection profile may include injecting a first amount of LPG during the intake stroke, followed by injecting a second amount of LPG during the compression stroke. The second amount of LPG may be greater than the first amount of LPG. In engine systems solely operating on DI, the direct injector may make both fuel injections (referred to herein as a split injection). In an engine system configured with both PFI and DI injectors, the first amount of LPG may be injected by a PFI injector, and the second amount of LPG may be injected by a DI injector. In this way, combustion knock can be mitigated in a feed-forward fashion. Injecting LPG during the compression stroke may have a cooling effect on the engine cylinder, due to the liquid heat of vaporization. The ratio of the first amount to the second amount (referred to herein as the "split ratio") may be predetermined, or may be based on current engine operating conditions. The split ratio may be set to provide maximum cylinder cooling, while minimizing fuel available to participate in combustion knock combustion. In some embodiments, at 320, the method further includes adjusting the injection profile of one or more affected cylinders where knock is anticipated, without further modifying spark timing of the one or more affected cylinders, and/or without further modifying injection timing and/or injection amounts of other, unaffected cylinders. Additionally, the method may include adjusting the injection profile of one or more affected cylinders where knock is anticipated without modifying the spark timing of other, unaffected cylinders.

Continuing at 330, method 300 may include determining whether combustion knock is detected. Combustion knock may be detected by one or more knock sensors, such as knock sensor 90 as discussed herein and shown in FIG. 2. Combustion knock may be localized to one or more individual cylinders or to one or more groups of cylinders. Combustion knock detection may be an ongoing process. If the injection profile has been adjusted for one or more cylinders where knock is anticipated, as shown at 320, combustion knock detection may occur as soon as one combustion cycle following the adjustment of the injection profile. In some examples, a fixed number of combustion cycles may be allowed to determine whether the injection profile adjustment at 320 has sufficiently cooled the affected cylinder, prior to acting upon knock detection. If combustion knock is not detected, method 300 may proceed to 325, and may include maintaining the current injection profile. If engine knock is detected, method 300 may proceed to 335.

At 335, method 300 may include adjusting the injection profile of the affected cylinders where knock has been detected. If combustion knock is localized to one or more individual cylinders, the injection profile of the individual cylinders may be adjusted. In scenarios where combustion knock is localized to one or more groups of cylinders, the injection profile of one or more cylinders out of the affected groups of cylinders may be adjusted. Adjusting the injection profile of the affected cylinders may include varying the injection timing and the split ratio. The injection profile(s) may be adjusted over varying time horizons, and may be different for different cylinders if more than one cylinder is affected. The injection timing and split ratios may be adjusted in adaptive fashion, where split ratios are learned for specific engine operating conditions and applied to subsequent combustion events. An example of adjusting injection timing and split ratios in this fashion is described herein and shown in FIG. 4B. For example, the amount of the first injection (during the intake stroke) may be increased to provide additional cooling to the cylinder. In some embodiments, at 335, the method further includes adjusting the injection profile of one or more affected cylinders where knock has been detected, without further modifying spark timing of the one or more affected cylinders, and/or without further modifying injection timing and/or injection amounts of other, unaffected cylinders. Additionally, the method may include adjusting the injection profile of one or more affected cylinders where knock is anticipated without modifying the spark timing of other, unaffected cylinders.

Continuing at 340, method 300 may include determining whether combustion knock is still detected following the adjusting of injection profiles of affected cylinders. If the injection profile has been adjusted for one or more cylinders where knock is detected, as shown at 335, continuing combustion knock detection may occur as soon as one combustion cycle following the adjustment of the injection profile. In some examples, a fixed number of combustion cycles may be allowed to determine whether the injection profile adjustment at 335 has sufficiently cooled the affected cylinder(s), prior to acting upon knock detection. If combustion knock is not detected, method 300 may proceed to 325, and may include maintaining the current injection profile. If combustion knock is detected, method 300 may proceed to 345.

At 345, method 300 may include adjusting the injection profile of all cylinders or a subset of cylinders including cylinders that have not had their injection profiles adjusted, even if combustion knock has not been anticipated or detected for those cylinders. Adjusting the injection profile may include varying the injection timing and/or the split ratio for each cylinder, as described at 320 and 335. The injection profiles may be adjusted to predetermined or learned injection profiles, and may be based on current engine operating conditions. In some embodiments, at 345, the method further includes adjusting the injection profile of all cylinders or a subset of cylinders including cylinders that have not had their injection profiles adjusted, even if combustion knock has not been anticipated or detected for those cylinders, without further modifying spark timing for those cylinders.

Continuing at 350, method 300 may include determining whether combustion knock is still detected following adjusting the injection profile of engine cylinders at 345. Continuing combustion knock detection may occur as soon as one combustion cycle following the adjustment of the injection profile(s). In some examples, a fixed number of combustion cycles may be allowed to determine whether the injection profile adjustment at 345 has sufficiently cooled the affected cylinder(s), prior to acting upon knock detection. If combustion knock is not detected, method 300 may proceed to 325, and may include maintaining the current injection profile. If combustion knock is detected, method 300 may proceed to 355.

A 355, method 300 may include adjusting the spark timing of one or more cylinders. Cylinders where knock is detected or anticipated may be subject to spark timing adjustments. In some scenarios, unaffected cylinders may also be subject to spark timing adjustments. Spark timing adjustment may include retarding the spark timing from the minimum best timing. Method 300 may then end. In some embodiments, at 355, the method further includes adjusting the spark timing of one or more cylinders while maintaining the current injection timing. For cylinders where the injection timing has been adjusted as shown at 320, 335, and/or 345, spark timing may be adjusted without further modifying the injection timing, and while maintaining the adjusted injection timing.

The engine systems described herein and shown in FIGS. 1 and 2, and the method 300 described herein and shown in FIG. 3 may enable one or more methods. For example, a method of mitigating combustion knock in a liquid-petroleum gas fueled engine, comprising: in response to the detection of combustion knock in a first engine cylinder, port fuel injecting a first quantity of fuel into the first engine cylinder when an intake valve of the first cylinder is open; direct fuel injecting a second quantity of fuel into the first engine cylinder when the intake valve of the first cylinder is closed; port fuel injecting a third quantity of fuel into a second engine cylinder when an intake valve of the second cylinder is open; and direct fuel injecting a fourth quantity of fuel into the second engine cylinder when the intake valve of the second cylinder is closed. The method may further comprise: in response to the continued detection of combustion knock in the first engine cylinder, increasing the first quantity of fuel; and retarding a spark ignition timing of the first engine cylinder relative to a previous spark ignition timing. The technical result of implementing this method is a reduction in combustion knock events by cooling the engine cylinder with LPG injection. In this way, spark timing may be maintained at minimum best timing as long as possible, or may be run closer to MBT than would be possible otherwise, thereby improving fuel economy and maximizing engine performance while mitigating combustion knock.

Figure 4A:
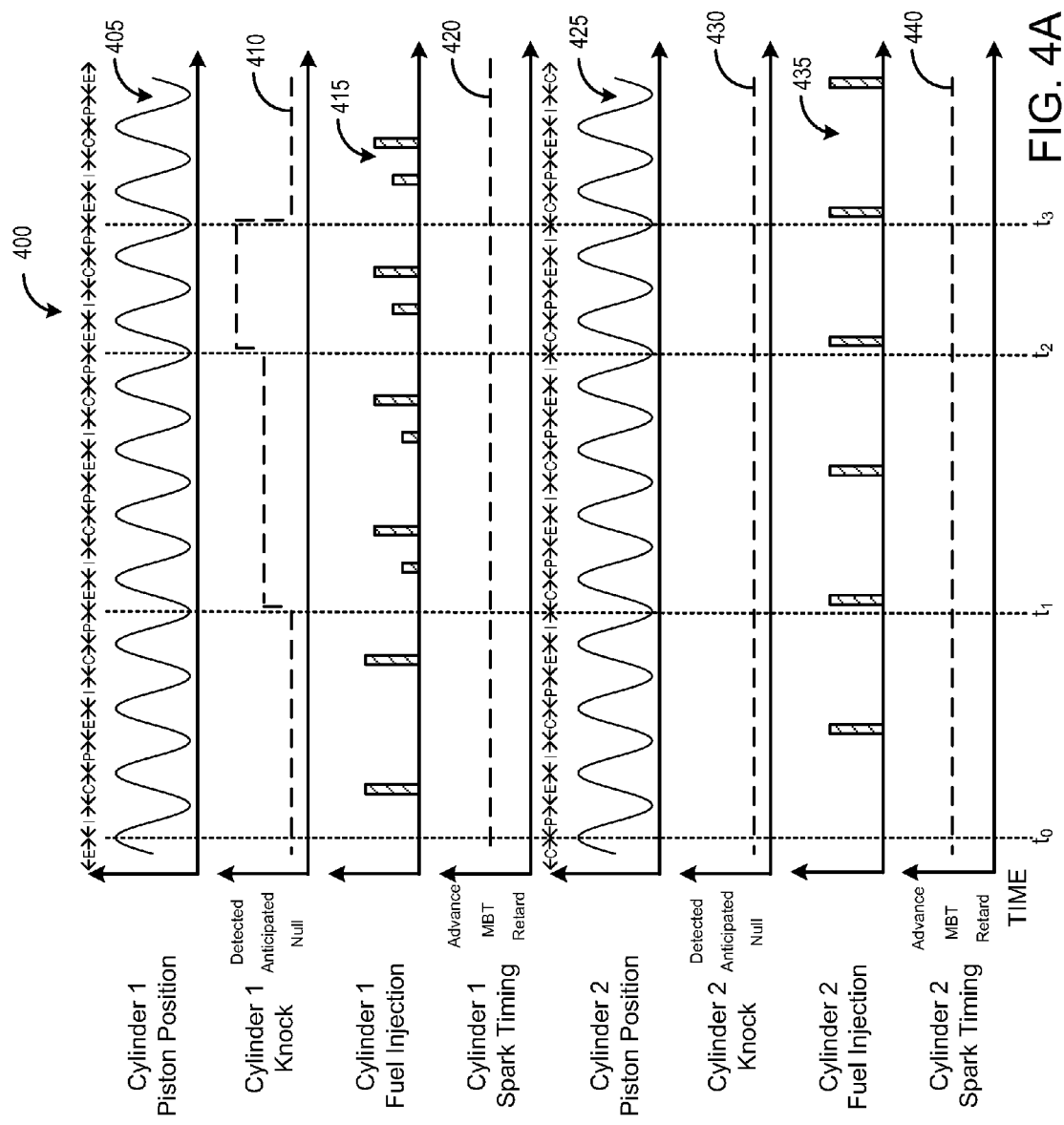
FIG. 4A is a graphical representation of an example timeline for vehicle operation and the operation of a fuel injection system according to the present disclosure.

FIG. 4A depicts an example timing plot 400 for controlling combustion knock in an internal combustion engine utilizing LPG for fuel and executing method 300 as described herein and shown in FIG. 3. Plot 405 represents piston position for a first cylinder (cylinder 1) undergoing a four-stroke engine cycle, including intake, compression, power, and ignition strokes, designated as I, C, P, and E, respectively. This plot may be considered to loop indefinitely.

Plot 410 represents combustion knock localized to the first cylinder. For simplicity, this plot depicts whether combustion knock is anticipated, detected, or not anticipated or detected (null) during each combustion cycle. In practice, specific combustion knock events may be detected, for example by knock sensor 90 as described herein and shown in FIG. 2.

Plot 415 represents fuel injection events into the first cylinder. This may include direct fuel injection events and/or port fuel injection events. The relative fuel quantity is represented by the area of each bar. The width of each bar represents the length of the injection event relative to the combustion cycle shown in plot 405.

Plot 420 represents spark timing for ignition within the first cylinder. As a default position, the spark ignition is set to the minimum best timing (MBT) for the engine operating conditions, in an effort to maximize engine output torque and fuel economy. In most scenarios, this includes spark ignition occurring at a few degrees prior to the piston reaching top dead center (TDC) of the compression stroke. The timing of spark ignition may be advanced or retarded from this position as engine operating conditions dictate.

Plots 425, 430, 435, and 440 represent piston position, combustion knock, fuel injection profile, and spark timing, respectively, for a second cylinder (cylinder 2) operating within the same engine as the first cylinder. The parameters are the same as for plots 405, 410, 415, and 420, respectively. The combustion cycle for the second cylinder is offset from the combustion cycle for the first cylinder by two strokes, e.g. when the first cylinder is in the exhaust stroke, the second cylinder is in the compression stroke.

At time $t_0$, cylinder 1 is beginning an intake stroke and cylinder 2 is beginning a power stroke, as shown in plots 405 and 425, respectively. Combustion knock is not anticipated or detected for either cylinder, as shown in plots 410 and 430. Both cylinders are utilizing MBT for spark ignition timing, as shown in plots 420 and 440. As such, both cylinders utilize a single, direct injection of LPG during the compression stroke.

At time $t_1$, combustion knock is anticipated in cylinder 1 based on engine operating conditions. As shown at 315 and 320 in FIG. 3, anticipation of combustion knock may be followed by adjusting the injection profile of the affected cylinder(s). As such, the injection profile of cylinder 1 is adjusted, as shown by plot 415. In this scenario, adjusting the injection profile includes splitting the fuel injection into two separate injection events: a first injection during the intake stroke and a second injection during the compression stroke. The first injection may be executed by a port fuel injector if the engine is so equipped. If the engine is configured to include only a direct fuel injector, both injections may be made by the direct fuel injector. In this example, the second injection contains a greater quantity of LPG than does the first injection. The first injection may occur while the intake valve is open (referred to herein as an open valve injection or OVI). No adjustment is made to the spark timing of cylinder 1, as shown by plot 420. Additionally, the injection profile and spark timing of cylinder 2 are maintained, as shown by plots 435 and 440.

At time $t_2$, combustion knock is detected in cylinder 1. As shown at 330 and 335 in FIG. 3, detection of combustion knock may be followed by adjusting the injection profile of the affected cylinder(s). As such, the injection profile of cylinder 1 is adjusted, as shown by plot 415. In this scenario, adjusting the injection profile includes increasing the amount of fuel injected during the intake stroke. In this example, the quantity of fuel injected during second injection is maintained, but in other scenarios may be decreased. Similarly, the injection timing of the first and second injections is maintained, but in other scenarios the timing of the injections may be adjusted. No adjustment is made to the spark timing of cylinder 1, as shown by plot 420. Additionally, the injection profile and spark timing of cylinder 2 are maintained, as shown by plots 435 and 440.

At time $t_3$, combustion knock is neither detected nor anticipated in cylinder 1 or cylinder 2. As shown at 340 and 325 of FIG. 3, this results in the maintaining of the current injection profile for cylinder 1. No adjustment is made to the spark timing of cylinder 1, as shown by plot 420. Additionally, the injection profile and spark timing of cylinder 2 are maintained, as shown by plots 435 and 440.

Figure 4B:
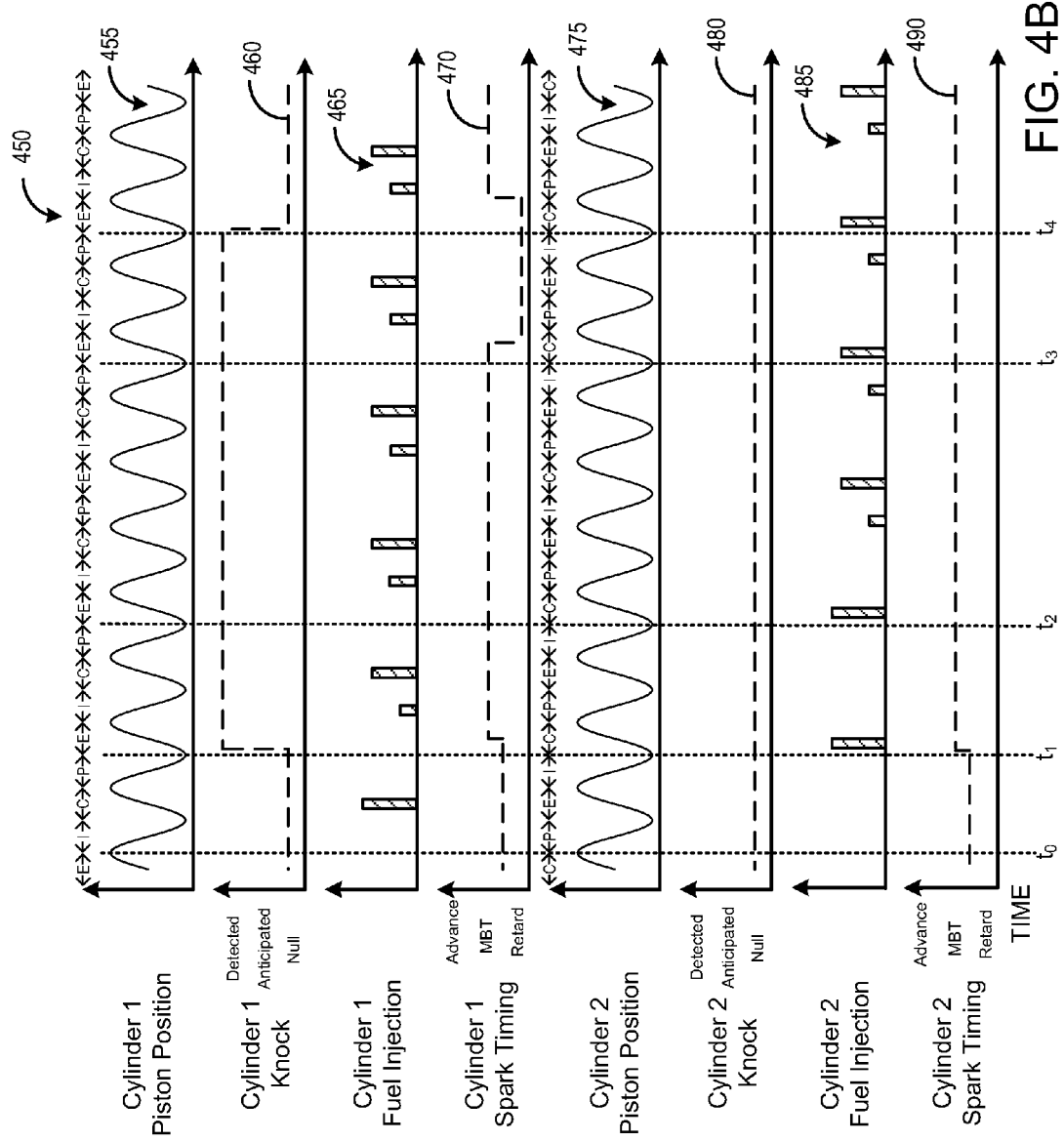
FIG. 4B is a graphical representation of an example timeline for vehicle operation and the operation of a fuel injection system according to the present disclosure.

FIG. 4B depicts an example timing plot 450 for controlling combustion knock in an internal combustion engine utilizing LPG for fuel and executing method 300 as described herein and shown in FIG. 3. Plot 455 represents piston position for a first cylinder (cylinder 1) undergoing a four-stroke engine cycle, including intake, compression, power, and ignition strokes, designated as I, C, P, and E, respectively. This plot may be considered to loop indefinitely.

Plot 460 represents combustion knock localized to the first cylinder. For simplicity, this plot depicts whether combustion knock is anticipated, detected, or not anticipated or detected (null) during each combustion cycle. In practice, specific combustion knock events may be detected, for example by knock sensor 90 as described herein and shown in FIG. 2.

Plot 465 represents fuel injection events into the first cylinder. This may include direct fuel injection events and/or port fuel injection events. The relative fuel quantity is represented by the area of each bar. The width of each bar represents the length of the injection event relative to the combustion cycle shown in plot 455.

Plot 470 represents spark timing for ignition within the first cylinder. As a default position, the spark ignition is set to the minimum best timing (MBT) for the engine operating conditions, in an effort to maximize engine output torque and fuel economy. In most scenarios, this includes spark ignition occurring at a few degrees prior to the piston reaching top dead center (TDC) of the compression stroke. The timing of spark ignition may be advanced or retarded from this position as engine operating conditions dictate.

Plots 475, 480, 485, and 490 represent piston position, combustion knock, fuel injection profile, and spark timing, respectively, for a second cylinder (cylinder 2) operating within the same engine as the first cylinder. The parameters are the same as for plots 455, 460, 465, and 470, respectively. The combustion cycle for the second cylinder is offset from the combustion cycle for the first cylinder by two strokes, e.g. when the first cylinder is in the exhaust stroke, the second cylinder is in the compression stroke.

At time $t_0$, cylinder 1 is beginning an intake stroke and cylinder 2 is beginning a power stroke, as shown in plots 455 and 475, respectively. Combustion knock is not anticipated or detected for either cylinder, as shown in plots 460 and 480. Both cylinders are initially utilizing a spark timing slightly retarded from, as shown in plots 470 and 490. As such, both cylinders utilize a single, direct injection of LPG during the compression stroke.

At time $t_1$, combustion knock is detected in cylinder 1. As shown at 330 and 335 in FIG. 3, detection of combustion knock may be followed by adjusting the injection profile of the affected cylinder(s). As such, the injection profile of cylinder 1 is adjusted, as shown by plot 465. In this scenario, adjusting the injection profile includes splitting the fuel injection into two separate injection events: a first injection during the intake stroke and a second injection during the compression stroke. The first injection may be executed by a port fuel injector if the engine is so equipped. If the engine is configured to include only a direct fuel injector, both injections may be made by the direct fuel injector. In this example, the second injection contains a greater quantity of LPG than does the first injection. The first injection may occur while the intake valve is open (referred to herein as an open valve injection or OVI). No adjustment is made to the spark timing of cylinder 1, as shown by plot 470. Additionally, the injection profile and spark timing of cylinder 2 are advanced to MBT, as shown by plots 485 and 490.

At time $t_2$, combustion knock is still detected in cylinder 1. As shown at 340 and 345 in FIG. 3, continuing detection of combustion knock may be followed by adjusting the injection profile of all cylinders. As such, the injection profile of cylinder 1 is adjusted as shown by plot 465, and the injection profile of cylinder 2 is adjusted as shown by plot 485.

In this scenario, adjusting the injection profile of cylinder 1 includes increasing the amount of fuel injected during the intake stroke. In this example, the quantity of fuel injected during second injection is maintained, but in other scenarios may be decreased. Similarly, the injection timing of the first and second injections is maintained, but in other scenarios the timing of the injections may be adjusted.

In this scenario, adjusting the injection profile of cylinder 2 includes splitting the fuel injection into two separate injection events: a first injection during the intake stroke and a second injection during the compression stroke. In this example, the second injection contains a greater quantity of LPG than does the first injection. The first injection may occur while the intake valve is open (OVI). The spark timings of cylinder 1 and cylinder 2 are not adjusted, as shown by plots 470 and 490.

At time $t_3$, combustion knock is still detected in cylinder 1. As shown at 350 and 355 in FIG. 3, continuing detection of combustion knock may be followed by adjusting the spark timing profile of the affected cylinders. As such, the spark timing of cylinder 1 is retarded from MBT, as shown by plot 470. The injection profiles of cylinders 1 and 2 are maintained at their previous profile, as shown by plots 465 and 485. The spark timing of cylinder 2 is not adjusted, as shown by plot 490.

At time $t_4$, combustion knock is neither detected nor anticipated in cylinder 1 or cylinder 2. As shown at 340 and 325 of FIG. 3, this results in the maintaining of the current injection profile for cylinders 1 and 2. In other scenarios, the injection profiles may be adjusted. In this scenario, the spark timing of cylinder 1 is returned to MBT, as shown by plot 470. In other scenarios, the spark timing of cylinder 1 may remain retarded, or be further adjusted based on engine operating conditions. No adjustment is made to the spark timing of cylinder 2, as shown by plot 490.

Figure 5:
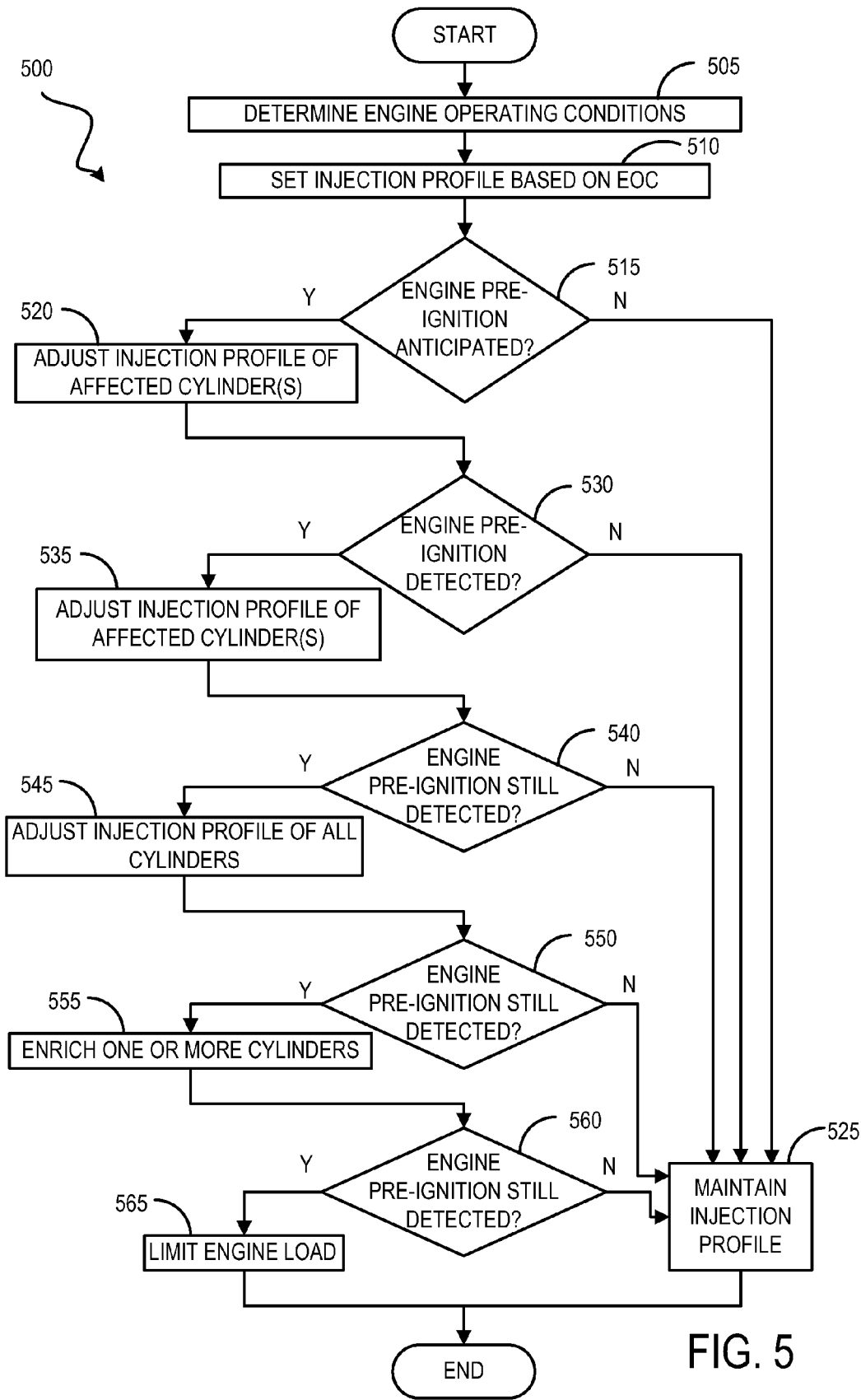
FIG. 5 depicts an example high level flow chart for mitigating cylinder pre-ignition in a liquid petroleum gas fueled engine.

FIG. 5 depicts an example high-level method 500 for controlling cylinder pre-ignition in an LPG fueled, direct injected internal combustion engine. Method 500 may be configured as computer instructions stored by a control system and implemented by a controller, for example controller 12 as shown in FIGS. 1 and 2. FIG. 5 will be described in reference to components and features of the example engine detailed in FIGS. 1 and 2, but it should be recognized that method 500 or other equivalent methods may be performed with respect to a plurality of engine configurations without departing from the scope of this disclosure. Method 500 may be run repeatedly throughout the course of engine operation. Method 500 may be run in conjunction with method 300, or other methods for controlling combustion knock.

Method 500 may begin at 505 by measuring or estimating engine operating conditions (EOC). As non-limiting examples, the operating conditions may include ambient temperature and pressure, pedal position (PP), engine speed, engine load, engine temperature, manifold air flow (MAF), manifold air pressure (MAP), etc. At 510, method 500 may include setting a fuel injection profile based on the EOC. The fuel injection profile may include a single injection or multiple injections. The injection profile may include port fuel injections (PFI), direct fuel injections (DI) or a combination of the two.

Continuing at 515, method 500 may include determining whether engine pre-ignition is anticipated. Determining if cylinder pre-ignition is anticipated may include evaluating current and anticipated engine operating conditions, such as engine temperature and engine load, and may further include determining which, if any, cylinders may be prone to preignition based on the current or anticipated engine operating conditions. If cylinder pre-ignition is not anticipated, method 500 may proceed to 525. At 525, method 500 may include maintaining the current fuel injection profile. If cylinder pre-ignition is anticipated, method 500 may proceed to 520.

At 520, method 500 may include adjusting the injection profile of one or more affected cylinders where pre-ignition is anticipated. Adjusting the injection profile may include injecting a first amount of LPG during the intake stroke, followed by injecting a second amount of LPG during the compression stroke. The second amount of LPG may be greater than the first amount of LPG. In engine systems solely operating on DI, the direct injector may make both fuel injections (referred to herein as a split injection). In an engine system configured with both PFI and DI injectors, the first amount of LPG may be injected by a PFI injector, and the second amount of LPG may be injected by a DI injector. In this way, cylinder pre-ignition can be mitigated in a feedforward fashion. Injecting LPG during the compression stroke may have a cooling effect on the engine cylinder, due to the liquid heat of vaporization. The ratio of the first amount to the second amount (referred to herein as the "split ratio") may be predetermined, or may be based on current engine operating conditions. The split ratio may be set to provide maximum cylinder cooling, while minimizing fuel available to participate in cylinder pre-ignition combustion. In some embodiments, at 520, the method further includes adjusting the injection profile of one or more affected cylinders where pre-ignition is anticipated, without further modifying the engine load, and/or without further modifying injection timing and/or injection amounts of other, unaffected cylinders. Additionally, the method may include adjusting the injection profile of one or more affected cylinders where pre-ignition is anticipated without modifying the engine load.

Continuing at 530, method 500 may include determining whether cylinder pre-ignition is detected. Cylinder pre-ignition may be detected by one or more knock sensors, such as knock sensor 90 as discussed herein and shown in FIG. 2. A cylinder pre-ignition event may be identified and distinguished from engine knocking based on the output of a knock sensor. For example, in response to a knock signal output by the knock sensor being larger than a higher threshold in an earlier crank angle window, pre-ignition may be determined. Pre-ignition detection may further include counting the number of pre-ignition events that occur over a period of time or a number of combustion cycles. Cylinder pre-ignition may be localized to one or more individual cylinders or to one or more groups of cylinders. Cylinder pre-ignition detection may be an ongoing process. If the injection profile has been adjusted for one or more cylinders where pre-ignition is anticipated, as shown at 520, cylinder pre-ignition detection may occur as soon as one combustion cycle following the adjustment of the injection profile. In some examples, a fixed number of combustion cycles may be allowed to determine whether the injection profile adjustment at 520 has sufficiently cooled the affected cylinder, prior to acting upon pre-ignition detection. If cylinder pre-ignition is not detected, method 500 may proceed to 525, and may include maintaining the current injection profile. If engine knock is detected, method 500 may proceed to 535.

At 535, method 500 may include adjusting the injection profile of the affected cylinders where pre-ignition has been detected. If cylinder pre-ignition is localized to one or more individual cylinders, the injection profile of the individual cylinders may be adjusted. In scenarios where cylinder pre-ignition is localized to one or more groups of cylinders, the injection profile of one or more cylinders out of the affected groups of cylinders may be adjusted. Adjusting the injection profile of the affected cylinders may include varying the injection timing and the split ratio. The injection profile(s) may be adjusted over varying time horizons, and may be different for different cylinders if more than one cylinder is affected. The injection timing and split ratios may be adjusted in adaptive fashion, where split ratios are learned for specific engine operating conditions and applied to subsequent combustion events. An example of adjusting injection timing and split ratios in this fashion is described herein and shown in FIGS. 6A-6B. For example, the amount of the first injection (during the intake stroke) may be increased to provide additional cooling to the cylinder. Further, the amount of the second injection may be increased to provide additional cooling to the cylinder. The timing of the second injection may also be delayed to be closer to spark ignition. In this way, less fuel will be available for potential pre-ignition combustion events. This strategy may also prevent bursts of pre-ignition following an initial pre-ignition event. While late injection of gasoline may create residual particulate matter or soot within a combustion cylinder, LPG may fully evaporate prior to spark ignition even with late injection timing. In some embodiments, at 535, the method further includes adjusting the injection profile of one or more affected cylinders where pre-ignition has been detected, without further modifying the engine load, and/or without further modifying injection timing and/or injection amounts of other, unaffected cylinders. Additionally, the method may include adjusting the injection profile of one or more affected cylinders where pre-ignition is anticipated without modifying the engine load.

Continuing at 540, method 500 may include determining whether cylinder pre-ignition is still detected following the adjusting of injection profiles of affected cylinders. If the injection profile has been adjusted for one or more cylinders where pre-ignition is detected, as shown at 535, continuing cylinder pre-ignition detection may occur as soon as one combustion cycle following the adjustment of the injection profile. In some examples, a fixed number of combustion cycles may be allowed to determine whether the injection profile adjustment at 535 has sufficiently cooled the affected cylinder(s), prior to acting upon pre-ignition detection. Pre-ignition detection may include counting the number of pre-ignition events that occur over a period of time or a number of combustion cycles. If cylinder pre-ignition is not detected, method 500 may proceed to 525, and may include maintaining the current injection profile. If cylinder pre-ignition is detected, method 500 may proceed to 545.

At 545, method 500 may include adjusting the injection profile of all cylinders or a subset of cylinders including cylinders that have not had their injection profiles adjusted, even if cylinder pre-ignition has not been anticipated or detected for those cylinders. Adjusting the injection profile may include varying the injection timing, split ratio, and/or the first and second injection amounts for each cylinder, as described at 520 and 535. The injection profiles may be adjusted to predetermined or learned injection profiles, and may be based on current engine operating conditions. The injection profiles may be adjusted based on the number of pre-ignition events that have been detected over a period of time or over a number of combustion cycles. In some embodiments, at 545, the method further includes adjusting the injection profile of all cylinders or a subset of cylinders including cylinders that have not had their injection profiles adjusted, even if combustion knock has not been anticipated or detected for those cylinders, without further modifying the engine load.

Continuing at 550, method 500 may include determining whether cylinder pre-ignition is still detected following adjusting the injection profile of engine cylinders at 545. Continuing cylinder pre-ignition detection may occur as soon as one combustion cycle following the adjustment of the injection profile(s). In some examples, a fixed number of combustion cycles may be allowed to determine whether the injection profile adjustment at 545 has sufficiently cooled the affected cylinder(s), prior to acting upon pre-ignition detection. If cylinder pre-ignition is not detected, method 500 may proceed to 525, and may include maintaining the current injection profile. If engine knock is detected, method 500 may proceed to 555.

At 555, method 500 may include enriching the injection profile of one or more cylinders. Enriching the injection profile of one or more cylinders may include increasing the first amount of fuel injected into the one or more cylinders, and/or increasing the second amount of fuel injected into the one or more cylinders. Enriching the injection profile of one or more cylinders may include increasing the amount of fuel injected into one or more cylinders without limiting the load of the engine. For example, the first and second amounts of fuel injected into one or more affected cylinders may be increased. Enriching the injection profile of one or more cylinders may further include increasing the amount of fuel injected into one or more unaffected cylinders. The method may further include enriching the injection profile of all cylinders or a subset of cylinders. The process may be iterative, or based on a pre-determined sequence of injection profiles. Method 500 may then proceed to 560.

Continuing at 560, method 500 may include determining whether cylinder pre-ignition is still detected following enriching the injection profile of one or more engine cylinders at 555. Continuing cylinder pre-ignition detection may occur as soon as one combustion cycle following the adjustment of the injection profile(s). In some examples, a fixed number of combustion cycles may be allowed to determine whether the injection profile enrichment at 555 has sufficiently cooled the affected cylinder(s), prior to acting upon pre-ignition detection. If cylinder pre-ignition is not detected, method 500 may proceed to 525, and may include maintaining the current injection profile. If engine pre-ignition is detected, method 500 may proceed to 5655.

At 565, method 500 may include limiting the engine load. Limiting the engine load may include one or more of reducing an opening of an intake throttle, increasing an opening of a turbocharger wastegate, adjusting a cylinder valve timing to reduce an intake air charge, and increasing an amount of exhaust gas recirculation. For example, the amount of intake air charge directed into the engine may be reduced by a first amount, for example, until the engine load is reduced below a first threshold. Load limiting routines may be determined by engine operating conditions and a number of pre-ignition events detected. Method 500 may then end. In some embodiments, at 555, the method further includes limiting the engine load while maintaining the current injection timing. For cylinders where the injection timing has been adjusted as shown at 320, 335, and/or 345, engine load may be limited without further modifying the injection timing, and while maintaining the adjusted injection timing.

The engine systems described herein and shown in FIGS. 1 and 2, and the method 500 described herein and shown in FIG. 5 may enable one or more methods. For example, a method of mitigating cylinder pre-ignition in a liquid-petroleum fueled engine, comprising: in response to the detection of cylinder pre-ignition in a first engine cylinder, port fuel injecting a first quantity of fuel into the first engine cylinder when an intake valve of the first cylinder is open; direct fuel injecting a second quantity of fuel into the first engine cylinder when the intake valve of the first cylinder is closed; port fuel injecting a third quantity of fuel into a second engine cylinder when an intake valve of the second cylinder is open; and direct fuel injecting a fourth quantity of fuel into the second engine cylinder when the intake valve of the second cylinder is closed. The method may further comprise: in response to the continued detection of cylinder pre-ignition in the first engine cylinder, increasing the first quantity of fuel; increasing the second quantity of fuel; and reducing the load of the liquid-petroleum fueled engine. The technical result of implementing this method is a reduction in cylinder pre-ignition events by cooling the engine cylinder with LPG injection. In this way, engine load may be maintained at desired levels as long as possible, thereby maximizing engine performance while mitigating cylinder pre-ignition.

Figure 6A:
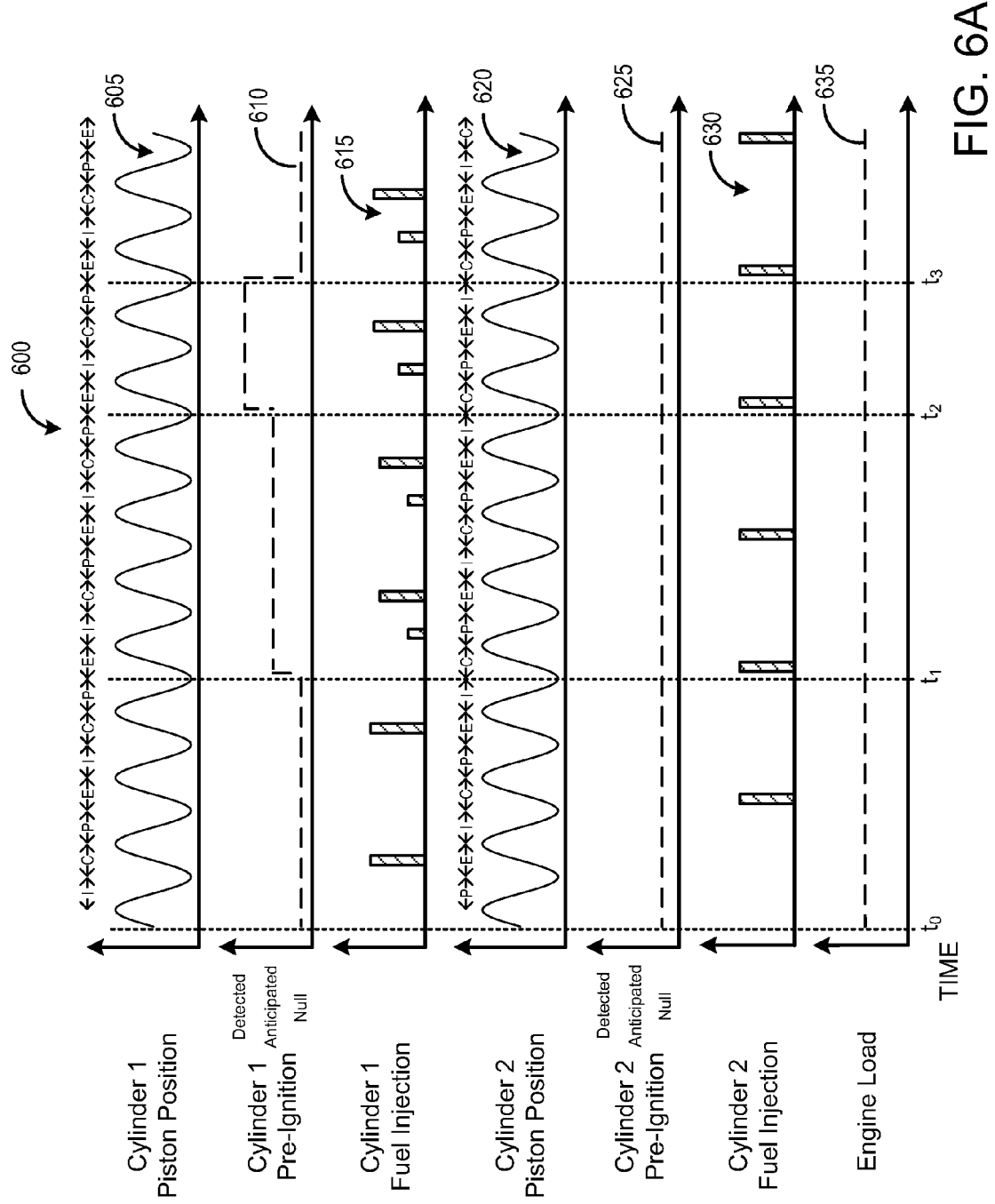
FIG. 6A is a graphical representation of an example timeline for vehicle operation and the operation of a fuel injection system according to the present disclosure.

FIG. 6A depicts an example timing plot 600 for controlling combustion knock in an internal combustion engine utilizing LPG for fuel and executing method 500 as described herein and shown in FIG. 5. Plot 605 represents piston position for a first cylinder (cylinder 1) undergoing a four-stroke engine cycle, including intake, compression, power, and ignition strokes, designated as I, C, P, and E, respectively. This plot may be considered to loop indefinitely.

Plot 610 represents cylinder pre-ignition localized to the first cylinder. For simplicity, this plot depicts whether pre-ignition knock is anticipated, detected, or not anticipated or detected (null) during each combustion cycle. In practice, specific pre-ignition events may be detected and counted, for example by knock sensor 90 as described herein and shown in FIG. 2.

Plot 615 represents fuel injection events into the first cylinder. This may include direct fuel injection events and/or port fuel injection events. The relative fuel quantity is represented by the area of each bar. The width of each bar represents the length of the injection event relative to the combustion cycle shown in plot 605.

Plots 620, 625, and 630 represent piston position, cylinder pre-ignition, and fuel injection profile, respectively, for a second cylinder (cylinder 2) operating within the same engine as the first cylinder. The parameters are the same as for plots 605, 610, and 615, respectively. The combustion cycle for the second cylinder is offset from the combustion cycle for the first cylinder by two strokes, e.g. when the first cylinder is in the exhaust stroke, the second cylinder is in the compression stroke. Plot 635 represents engine load for the engine comprising cylinders 1 and 2.

At time $t_0$, cylinder 1 is beginning an intake stroke and cylinder 2 is beginning a power stroke, as shown in plots 605 and 620, respectively. Cylinder pre-ignition is not anticipated or detected for either cylinder, as shown in plots 610 and 625. Both cylinders are utilizing MBT for spark ignition timing. As such, both cylinders utilize a single, direct injection of LPG during the compression stroke.

At time $t_1$, cylinder pre-ignition is anticipated in cylinder 1 based on engine operating conditions. As shown at 515 and 520 in FIG. 5, anticipation of combustion knock may be followed by adjusting the injection profile of the affected cylinder(s). As such, the injection profile of cylinder 1 is adjusted, as shown by plot 615. In this scenario, adjusting the injection profile includes splitting the fuel injection into two separate injection events: a first injection during the intake stroke and a second injection during the compression stroke. The first injection may be executed by a port fuel injector if the engine is so equipped. If the engine is configured to include only a direct fuel injector, both injections may be made by the direct fuel injector. In this example, the second injection contains a greater quantity of LPG than does the first injection. The first injection may occur while the intake valve is open (OVI). No adjustment is made to the injection profile of cylinder 2, as shown by plot 630.

At time $t_2$, cylinder pre-ignition is detected in cylinder 1. As shown at 530 and 535 in FIG. 5, detection of cylinder pre-ignition may be followed by adjusting the injection profile of the affected cylinder(s). As such, the injection profile of cylinder 1 is adjusted, as shown by plot 615. In this scenario, adjusting the injection profile includes increasing the amount of fuel injected during the intake stroke, increasing the amount of fuel injected during the compression stroke, and delaying the timing of the second fuel injection, placing the second fuel injection closer to spark ignition. The injection profile of cylinder 2 is maintained, as shown by plot 630.

At time $t_3$, cylinder pre-ignition is neither detected nor anticipated in cylinder 1 or cylinder 2. As shown at 540 and 525 of FIG. 5, this results in the maintaining of the current injection profile for cylinder 1, as shown by plot 615. Additionally, the injection profile of cylinder 2 is maintained, as shown by plot 630.

Figure 6B:
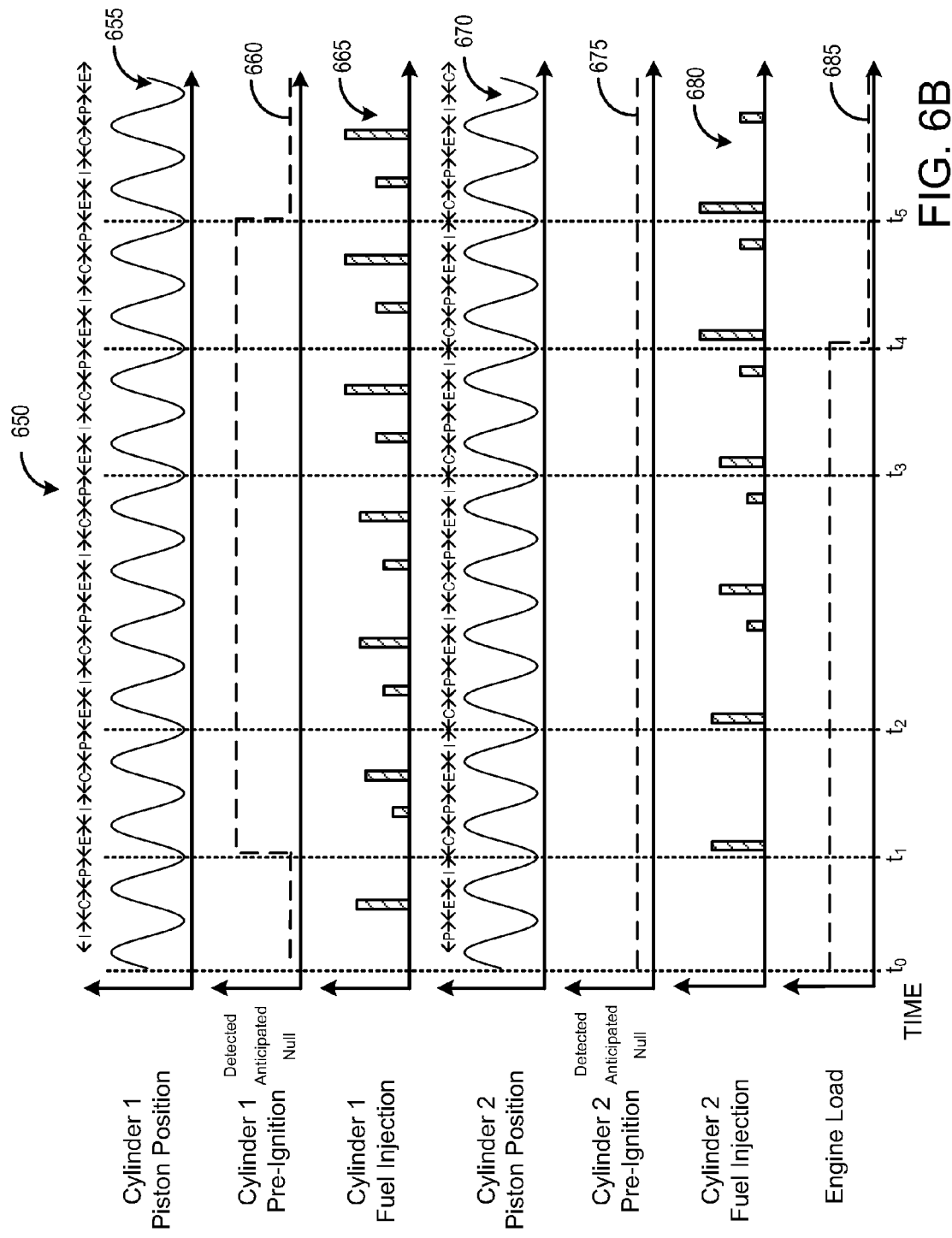
FIG. 6B is a graphical representation of an example timeline for vehicle operation and the operation of a fuel injection system according to the present disclosure.

FIG. 6B depicts an example timing plot 650 for controlling combustion knock in an internal combustion engine utilizing LPG for fuel and executing method 500 as described herein and shown in FIG. 5. Plot 655 represents piston position for a first cylinder (cylinder 1) undergoing a four-stroke engine cycle, including intake, compression, power, and ignition strokes, designated as I, C, P, and E, respectively. This plot may be considered to loop indefinitely.

Plot 660 represents cylinder pre-ignition localized to the first cylinder. For simplicity, this plot depicts whether pre-ignition knock is anticipated, detected, or not anticipated or detected (null) during each combustion cycle. In practice, specific pre-ignition events may be detected and counted, for example by knock sensor 90 as described herein and shown in FIG. 2.

Plot 665 represents fuel injection events into the first cylinder. This may include direct fuel injection events and/or port fuel injection events. The relative fuel quantity is represented by the area of each bar. The width of each bar represents the length of the injection event relative to the combustion cycle shown in plot 655.

Plots 670, 675, and 680 represent piston position, cylinder pre-ignition, and fuel injection profile, respectively, for a second cylinder (cylinder 2) operating within the same engine as the first cylinder. The parameters are the same as for plots 655, 660, and 665, respectively. The combustion cycle for the second cylinder is offset from the combustion cycle for the first cylinder by two strokes, e.g. when the first cylinder is in the exhaust stroke, the second cylinder is in the compression stroke. Plot 685 represents engine load for the engine comprising cylinders 1 and 2.

At time $t_0$, cylinder 1 is beginning an intake stroke and cylinder 2 is beginning a power stroke, as shown in plots 605 and 620, respectively. Cylinder pre-ignition is not anticipated or detected for either cylinder, as shown in plots 610 and 625. Both cylinders are utilizing MBT for spark ignition timing. As such, both cylinders utilize a single, direct injection of LPG during the compression stroke.

At time $t_1$, cylinder pre-ignition is detected in cylinder 1. As shown at 530 and 535 in FIG. 5, detection of combustion knock may be followed by adjusting the injection profile of the affected cylinder(s). As such, the injection profile of cylinder 1 is adjusted, as shown by plot 665. In this scenario, adjusting the injection profile includes splitting the fuel injection into two separate injection events: a first injection during the intake stroke and a second injection during the compression stroke. The first injection may be executed by a port fuel injector if the engine is so equipped. If the engine is configured to include only a direct fuel injector, both injections may be made by the direct fuel injector. In this example, the second injection contains a greater quantity of LPG than does the first injection. The first injection may occur while the intake valve is open (OVI). The injection profile of cylinder 2 is maintained, as shown by plot 680.

At time $t_2$, cylinder pre-ignition is still detected in cylinder 1. As shown at 540 and 545 in FIG. 5, continuing detection of cylinder pre-ignition may be followed by adjusting the injection profile of all cylinders. As such, the injection profile of cylinder 1 is adjusted as shown by plot 665, and the injection profile of cylinder 2 is adjusted as shown by plot 680.

In this scenario, adjusting the injection profile includes increasing the amount of fuel injected during the intake stroke, increasing the amount of fuel injected during the compression stroke, and delaying the timing of the second fuel injection, placing the second fuel injection closer to spark ignition, as shown by plot 665.

In this scenario, adjusting the injection profile of cylinder 2 includes splitting the fuel injection into two separate injection events: a first injection during the intake stroke and a second injection during the compression stroke. In this example, the second injection contains a greater quantity of LPG than does the first injection. The first injection may occur while the intake valve is open (OVI). Adjusting the injection profiles of cylinders 1 and 2 in this scenario may be based on a number of pre-ignition events detected over a period of time or a set number of combustion cycles.

At time t3, cylinder pre-ignition is still detected in cylinder 1. As shown at 550 and 555 in FIG. 5, continuing detection of cylinder pre-ignition may be followed by enriching the injection profiles of one or more cylinders. The amounts of the first and second injections for cylinders 1 and 2 are increased, as shown by plots 665 and 680. In other scenarios, only cylinder 1 (the affected cylinder) may be enriched. In some scenarios, only the amount of either the first or second injection may be increased.

At time $t_4$, cylinder pre-ignition is still detected in cylinder 1. As shown at 560 and 565 in FIG. 5, continuing detection of cylinder pre-ignition may be followed by reducing the engine load, as shown by plot 685. The injection profiles of cylinders 1 and 2 are maintained at their previous profile, as shown by plots 665 and 680, but in other scenarios, the one or more injection profiles may also be adjusted.

At time $t_5$, cylinder pre-ignition is neither detected nor anticipated in cylinder 1 or cylinder 2. As shown by plots 665 and 680, the injection profiles of cylinders 1 and 2 are maintained, but in other scenarios one or more injection profiles may be adjusted based on engine operating conditions. Similarly, a decreased engine load is maintained, as shown by plot 685, but in other scenarios the engine load may be increased based on engine operating conditions.

The engine systems described herein and shown in FIGS. 1 and 2, and the methods 300 and 500 described herein and shown in FIGS. 3 and 5, respectively may enable one or more methods. For example, a method for an engine, comprising: during a first condition comprising a high engine temperature, injecting a first quantity of liquid petroleum gas into a first engine cylinder at a first timing during an intake stroke; and injecting a second quantity of liquid petroleum gas into the first engine cylinder at a second timing during a compression stroke following the intake stroke. In some embodiments, the second quantity of liquid petroleum gas is greater than the first quantity of liquid petroleum gas, and the first and second quantities are injected in a common four-stroke combustion cycle of the first engine cylinder. In some embodiments, the first condition further includes anticipation of a combustion knock event in the first engine cylinder. The method may further comprise: during a second condition, following the first condition, increasing the first quantity of liquid petroleum gas. The second condition may include the detection of a combustion knock event in the first engine cylinder. The method may further comprise: during a third condition, following the second condition, injecting a third quantity of liquid petroleum gas into a second engine cylinder at a third timing during an intake stroke; and injecting a fourth quantity of liquid petroleum gas into the second engine cylinder at a fourth timing during a compression stroke following the intake stroke. In some embodiments, the third condition includes the detection of a combustion knock event in the first engine cylinder. The fourth quantity of liquid petroleum gas may be greater than the third quantity of liquid petroleum gas. The method may further comprise: during a fourth condition, following the third condition, retarding a spark ignition timing of the first engine cylinder relative to the spark ignition timing of the first condition.

In some embodiments, the first condition further includes the anticipation of a cylinder pre-ignition event in the first engine cylinder. The method may further comprise: during a second condition, following the first condition, increasing the first quantity of liquid petroleum gas and increasing the second quantity of liquid petroleum gas. In some embodiments, the second condition includes the detection of a cylinder pre-ignition event in the first engine cylinder. The method may further comprise: during a third condition, following the second condition, injecting a third quantity of liquid petroleum gas into a second engine cylinder at a third timing during an intake stroke; and injecting a fourth quantity of liquid petroleum gas into the second engine cylinder during a compression stroke following the intake stroke. In some embodiments, the third condition includes the detection of a cylinder pre-ignition event in the first engine cylinder. The fourth quantity of liquid petroleum gas may be greater than the third quantity of petroleum gas. The method may further comprise: during a fourth condition, following the third condition, increasing the third quantity of liquid petroleum gas and increasing the fourth quantity of liquid petroleum gas; and during a fifth condition, following the fourth condition, decreasing a load of the engine.

The technical result of implementing this method is a feed-forward mechanism of cooling engine cylinders where combustion knock and/or cylinder pre-ignition is anticipated and/or detected. By cooling the engine cylinders solely via adjusting the timing and quantity of fuel injected, engine spark timing and engine load may be maintained, improving fuel economy and maximizing engine performance.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
before detecting or anticipating combustion knock, injecting a first quantity of liquid petroleum gas into a first engine cylinder in a single injection during a compression stroke;
during a first condition comprising a high engine temperature and anticipation of a combustion knock event in the first cylinder, injecting a second quantity of liquid petroleum gas into the first engine cylinder at a first timing during an intake stroke; and
injecting a third quantity of liquid petroleum gas into the first engine cylinder at a second timing during a compression stroke following the intake stroke, the third quantity being less than the first quantity.

2. The method of claim 1, where the third quantity of liquid petroleum gas is greater than the second quantity of liquid petroleum gas, and where the first, second, and third quantities are injected in a common four-stroke combustion cycle of the first engine cylinder.

3. The method of claim 1, further comprising:
during a second condition, following the first condition, increasing the second quantity of liquid petroleum gas.

4. The method of claim 3, where the second condition includes detection of a combustion knock event in the first engine cylinder.

5. The method of claim 3, further comprising:
during a third condition, following the second condition, injecting a fourth quantity of liquid petroleum gas into a second engine cylinder at a third timing during an intake stroke; and
injecting a fifth quantity of liquid petroleum gas into the second engine cylinder at a fourth timing during a compression stroke following the intake stroke.

6. The method of claim 5, where the third condition includes detection of a combustion knock event in the first engine cylinder.

7. The method of claim 5, where the fifth quantity of liquid petroleum gas is greater than the fourth quantity of liquid petroleum gas.

8. The method of claim 5, further comprising:
during a fourth condition, following the third condition, retarding a spark ignition timing of the first engine cylinder relative to spark ignition timing of the first condition.

9. The method of claim 1, where the first condition further includes anticipation of a cylinder pre-ignition event in the first engine cylinder.

10. The method of claim 9, further comprising:
during a second condition, following the first condition, increasing the second quantity of liquid petroleum gas and increasing the third quantity of liquid petroleum gas.

11. The method of claim 10, where the second condition includes detection of a cylinder pre-ignition event in the first engine cylinder.

12. The method of claim 10, further comprising:
during a third condition, following the second condition, injecting a fourth quantity of liquid petroleum gas into a second engine cylinder at a third timing during an intake stroke; and
injecting a fifth quantity of liquid petroleum gas into the second engine cylinder during a compression stroke following the intake stroke.

13. The method of claim 12, where the third condition includes detection of a cylinder pre-ignition event in the first engine cylinder.

14. The method of claim 12, where the fifth quantity of liquid petroleum gas is greater than the fourth quantity of liquid petroleum gas.

15. The method of claim 12, further comprising:
during a fourth condition, following the third condition, increasing the fourth quantity of liquid petroleum gas and increasing the fifth quantity of liquid petroleum gas; and
during a fifth condition, following the fourth condition, decreasing a load of the engine.

16. A method of mitigating combustion knock in a liquid-petroleum gas fueled engine, comprising:
before detecting or anticipating combustion knock in a first engine cylinder, direct fuel injecting a first quantity of liquid petroleum gas into the first engine cylinder in a single injection when an intake valve of the first cylinder is closed;
in response to detection of combustion knock in the first engine cylinder, port fuel injecting a second quantity of liquid petroleum gas into the first engine cylinder when the intake valve of the first engine cylinder is open;
direct fuel injecting a third quantity of liquid petroleum gas into the first engine cylinder when the intake valve of the first engine cylinder is closed, the third quantity being less than the first quantity;

port fuel injecting a fourth quantity of liquid petroleum gas into a second engine cylinder when an intake valve of the second engine cylinder is open; and direct fuel injecting a fifth quantity of liquid petroleum gas into the second engine cylinder when the intake valve of the second engine cylinder is closed.

17. The method of claim 16, further comprising:

in response to continued detection of combustion knock in the first engine cylinder, increasing the second quantity of liquid petroleum gas; and retarding a spark ignition timing of the first engine cylinder relative to a previous spark ignition timing.

18. A method of mitigating cylinder pre-ignition in a liquid-petroleum fueled engine, comprising:

before detecting or anticipating cylinder pre-ignition in a first engine cylinder, direct fuel injecting a first quantity of liquid petroleum gas into the first engine cylinder in a single injection when an intake valve of the first engine cylinder is closed;

in response to detection of cylinder pre-ignition in the first engine cylinder, port fuel injecting a second quantity of liquid petroleum gas into the first engine cylinder when the intake valve of the first engine cylinder is open;

direct fuel injecting a third quantity of liquid petroleum gas into the first engine cylinder when the intake valve of the first engine cylinder is closed, the third quantity being less than the first quantity;

port fuel injecting a fourth quantity of liquid petroleum gas into a second engine cylinder when an intake valve of the second engine cylinder is open; and direct fuel injecting a fifth quantity of liquid petroleum gas into the second engine cylinder when the intake valve of the second engine cylinder is closed.

19. The method of claim 18, further comprising:

in response to continued detection of cylinder pre-ignition in the first engine cylinder, increasing the second quantity of liquid petroleum gas;

increasing the third quantity of liquid petroleum gas; and reducing a load of the liquid-petroleum fueled engine.

20. The method of claim 19, further comprising:

in response to a cessation of cylinder pre-ignition in the first engine cylinder, continuing to port fuel inject the second quantity of liquid petroleum gas into the first engine cylinder when the intake valve of the first engine cylinder is open; and continuing to direct fuel inject the third quantity of liquid petroleum gas into the first engine cylinder when the intake valve of the first engine cylinder is closed.

\* \* \* \* \*